(12) United States Patent
Murakami

(10) Patent No.: US 8,909,869 B2
(45) Date of Patent: Dec. 9, 2014

(54) CACHE MEMORY CONTROLLING APPARATUS

(75) Inventor: Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 808 days.

(21) Appl. No.: 12/868,988

(22) Filed: Aug. 26, 2010

(65) Prior Publication Data

US 2011/0055481 A1 Mar. 3, 2011

(30) Foreign Application Priority Data

Aug. 28, 2009 (JP) ................................. 2009-198882

(51) Int. Cl.
*G06F 12/08* (2006.01)
(52) U.S. Cl.
CPC ................................ *G06F 12/0875* (2013.01)
USPC .................... 711/133; 711/118; 711/E12.017
(58) Field of Classification Search
None
See application file for complete search history.

(56) References Cited

U.S. PATENT DOCUMENTS

| 7,096,336 | B2 | 8/2006 | Furuhashi et al. | |
|---|---|---|---|---|
| 7,761,532 | B2 | 7/2010 | Moriwaki | |
| 2005/0120180 | A1* | 6/2005 | Schornbach et al. | 711/133 |
| 2010/0211594 | A1* | 8/2010 | Penders et al. | 707/769 |

FOREIGN PATENT DOCUMENTS

| JP | 2001-75850 A | 3/2001 |
|---|---|---|
| JP | 2005-196625 A | 7/2005 |
| JP | 2006-209457 A | 8/2006 |

OTHER PUBLICATIONS

Fujitsu, Laboratories L. "Fujitsu Laboratories Develops ID Information Repository Technology", Sep. 16, 2008.

\* cited by examiner

*Primary Examiner* — Charles Rones
*Assistant Examiner* — Ryan Dare
(74) *Attorney, Agent, or Firm* — Fujitsu Patent Center

(57) ABSTRACT

A controlling a cache memory includes: a data receiving unit to receive a sensor ID and data detected by the sensor; an attribute information acquiring unit to acquire attribute information corresponding to the sensor ID, from an attribute information memory, the attribute information memory storing the attribute information of the sensor mapped to the sensor ID; a sensor information memory to store information of a storage period, the sensor information memory including a cache memory storing the attribute information; and a cache memory control unit to acquire the attribute information from the attribute information acquiring unit when the attribute information is not stored in the cache memory, and store the acquired attribute information corresponding to the sensor ID in the cache memory during the storage period.

14 Claims, 18 Drawing Sheets

FIG. 4

| SENSOR ID | ATTRIBUTE INFORMATION | STORAGE PERIOD | REWRITE TIME |
|---|---|---|---|
| 001 | CONFERENCE ROOM | 200ms | ···09:30:41.5000 |
| 003 | DEVELOPMENT ROOM | 300ms | ···09:31:28.0000 |
| | | | |

FIG. 5

| SENSOR ID | INTERMITTENT CONNECTION | STORAGE PERIOD |
|---|---|---|
| 001 | YES | 200ms |
| 002 | NO | |
| 003 | YES | 300ms |

FIG. 6

| SENSOR ID | ACQUISITION TIME | ACQUISITION INTERVAL |
|---|---|---|
| 001 | ···09:00:00.000 | |
| 001 | ···09:00:00.100 | 100ms |
| 001 | ···09:00:00.200 | 100ms |
| | | |

FIG. 7

| SENSOR ID | ATTRIBUTE INFORMATION |
|---|---|
| 001 | CONFERENCE ROOM |
| 003 | DEVELOPMENT ROOM |

FIG. 12

| SENSOR ID | ACQUISITION TIME | ACQUISITION INTERVAL |
|---|---|---|
| 001 | ···09:00:00.000 | |
| 001 | ···09:00:00.100 | 100ms |
| 001 | ···09:00:00.200 | 100ms |
| 001 | ···09:03:00.000 | 179800ms |
| 001 | ···09:03:00.100 | 100ms |
| 001 | ···09:03:00.200 | 100ms |
| 001 | ···09:05:00.000 | 119800ms |
| 001 | ···09:03:00.100 | 100ms |

FIG. 16

| SENSOR ID | ATTRIBUTE INFORMATION | STORAGE PERIOD | REAQUISITION | REWRITE TIME |
|---|---|---|---|---|
| 001 | CONFERENCE ROOM | 200ms | NO | ···09:30:41.5000 |
| 003 | DEVELOPMENT ROOM | 300ms | YES | ···09:31:28.0000 |
| | | | | |

CACHE MEMORY CONTROLLING APPARATUS

CROSS-REFERENCE TO RELATED APPLICATIONS

This application is based upon and claims the benefit of priority of the prior Japanese Patent Application No. 2009-198882, filed on Aug. 28, 2009, the entire contents of which are incorporated herein by reference.

FIELD

The embodiments discussed herein are directed to a cache memory controlling apparatus controlling, in a cache memory, storage and deletion of attribute information related to a sensor that detects data.

BACKGROUND

Currently, a system is available that sends data detected by a sensor, e.g. a temperature sensor, to a central apparatus such as a host computer, for example, and that executes a variety of applications including controlling air conditioning in response to the data received by the central apparatus.

In such a system, the sensor sends to the central apparatus the detected data and a sensor ID uniquely identifying the sensor. The central apparatus accesses a database having stored the sensor ID and attribute information indicating an attribute of the sensor and mapped to the sensor, and acquires the attribute information corresponding to the sensor ID. The central apparatus includes a cache memory, and stores temporarily the acquired attribute information in the cache memory. If data is acquired from the same sensor in a subsequent cycle, the central apparatus acquires the attribute information from the cache memory rather than from the database. The access load to the database is thus reduced.

The sensors include not only a continuous connection type that usually remains connected to a network and sends detected data on a real-time basis, but also an intermittent connection type that sends data intermittently, and a hybrid type that is switched appropriately between a continued connection operation and an intermittent connection operation.

The intermittent connection type sensor detects data periodically, and stores the detected data in a memory therein. When connected to the network, the intermittent connection type sensor sends the data stored in the memory to the central apparatus in a data burst.

SUMMARY

According to an aspect of the invention, an apparatus for controlling a cache memory includes: a data receiving unit to receive a sensor ID identifying a sensor and data detected by the sensor; an attribute information acquiring unit to acquire attribute information corresponding to the sensor ID from an attribute information memory, the attribute information memory storing the attribute information of the sensor mapped to the sensor ID; a sensor information memory to store sensor information including a storage period, the sensor information memory including a cache memory storing the attribute information mapped to the sensor ID; and a cache memory control unit to, acquire the attribute information from the attribute information acquiring unit when the attribute information corresponding to the sensor ID received by the data receiving unit is not stored in the cache memory, and store the acquired attribute information corresponding to the sensor ID in the cache memory during the storage period.

The object and advantages of the invention will be realized and attained by at least the feature, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of data stored in a cache memory in a cache memory controlling apparatus of the first embodiment;

FIG. 5 illustrates an example of sensor information stored in a sensor information memory in the cache memory controlling apparatus of the first embodiment;

FIG. 6 illustrates an example of data stored in a log memory in the cache memory controlling apparatus of the first embodiment;

FIG. 7 illustrates an example of data stored in an attribute information memory in a database in the cache memory controlling system of the first embodiment;

FIG. 12 illustrates data acquired in the rewrite process;

FIG. 16 illustrates sensor information stored in a cache memory in a cache memory controlling apparatus of a fourth embodiment;

DESCRIPTION OF EMBODIMENTS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Figure 1:
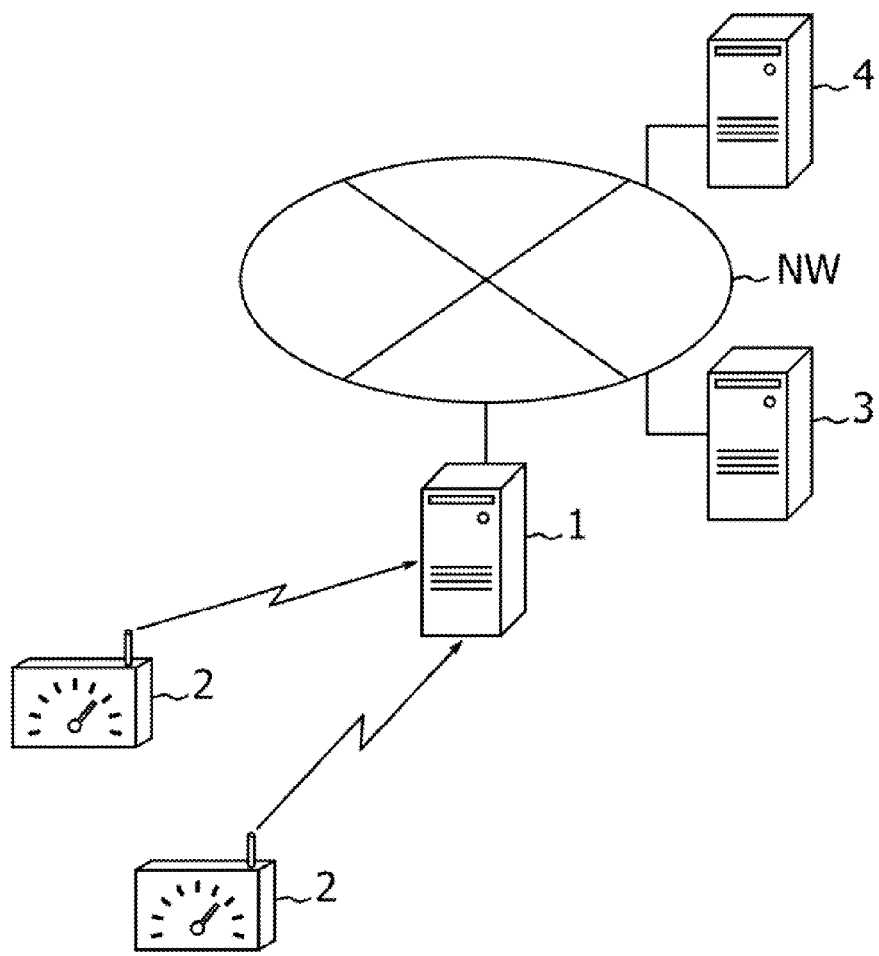
FIG. 1 diagrammatically illustrates a cache memory controlling system of a first embodiment.

FIG. 1 diagrammatically illustrates the cache memory controlling system of a first embodiment. Referring to FIG. 1, a central apparatus 1 such as a host computer, for example, is used as a cache memory controlling apparatus in the present application. The cache memory controlling apparatus 1 is connected to a communication network NW such as a local-area network (LAN), a wide-area network (WAN), a virtual private network (VPN), the Internet or the like. The cache memory controlling apparatus 1 is connected via the communication network NW to a variety of apparatuses including a plurality of sensors 2 such as a temperature sensor, a database 3 used as an attribute information memory to be discussed later, and an application apparatus 4 performing a variety of processes on the data detected by the sensors 2.

The sensor 2 may be mounted on a variety of objects including an outside surface, a wall, or a ceiling of a building as an immovable property, a variety of commercial goods, automobiles, a cellular phone (or other movable property), human bodies, and bodies of other living creatures, for example. The sensors 2 include a variety of sensors detecting an ambient condition, and a condition therein. Detection targets of the sensor 2 include e.g., temperature, humidity, weight, a position thereof. A variety of measuring targets of the sensor 2 include weight or the number of steps taken by a person, for example. Furthermore, the sensor 2 may have sound recording and image capturing targets e.g., an image, video, and sound. The sensor 2 sends data obtained through detection, together with a sensor identification (identification) or transmission source ID to the cache memory controlling apparatus 1.

The sensors 2 include a variety of types that are divided into a continuous connection type, an intermittent connection type, a switch type, and the like. The continuous connection type sends the detection data to the communication network NW on a real-time basis. The intermittent type is intermittently connected to the communication network NW and stores the detection data, and then sends the stored data in a burst when the sensor 2 is intermittently connected to the communication network NW. The switch type switches between a continuous connection operation and an intermittent connection operation with communication network NW every specified time interval.

The database 3 stores attribute information, called a profile indicating an attribute of the detection data or the sensor 2, with the sensor ID mapped to the attribute information. The attribute information of the sensor 2 is a variety of information including, for example, the type of the sensor 2, such as a global positioning system (GPS) device, the type of detection data such as temperature, or position, a detection period, unit, reliability, a supply destination (the application apparatus 4).

The cache memory controlling apparatus 1 receives the detection data and the sensor ID sent by the sensor 2, and acquires the attribute information corresponding to the sensor ID from the database 3. The cache memory controlling apparatus 1 maps the detection data to the attribute information, and sends the detection data and the attribute information to the application apparatus 4. As described later, the cache memory controlling apparatus 1 includes a cache memory, and stores temporarily in the cache memory the attribute information acquired from the database 3. Accordingly, the access load to the database 3 is reduced.

The application apparatus 4 performs a variety of processes including, e.g. calculation, control, and management processes on the received detection data and attribute information. For example, an air-conditioning control process is performed based on temperature data, or a movement tracking management process is performed based on position data.

Referring to FIG. 1, the cache memory controlling apparatus 1, the sensor 2, the database 3, and the application apparatus 4 are separate apparatuses. In accordance with the present application, the elements may be configured in a variety of arrangements. For example, the cache memory controlling apparatus 1 and the application apparatus 4 may be integrated into one apparatus. In such a case, the function of the cache memory controlling apparatus 1 may be implemented in a circuit of the application apparatus 4, or a module of a program of the application apparatus 4. Alternatively, the cache memory controlling apparatus 1 and the database 3 may be integrated into one apparatus, and a plurality of application apparatuses 4 may be arranged. Rather than connecting the cache memory controlling apparatus 1, the database 3, and the application apparatus 4 through the same communication network NW, the cache memory controlling apparatus 1 and the database 3 may be connected via an exclusive communication line and the cache memory controlling apparatus 1 and the application apparatus 4 may be connected via another exclusive communication line. The communication network NW may partially include a wireless communication, for example.

Figure 2:
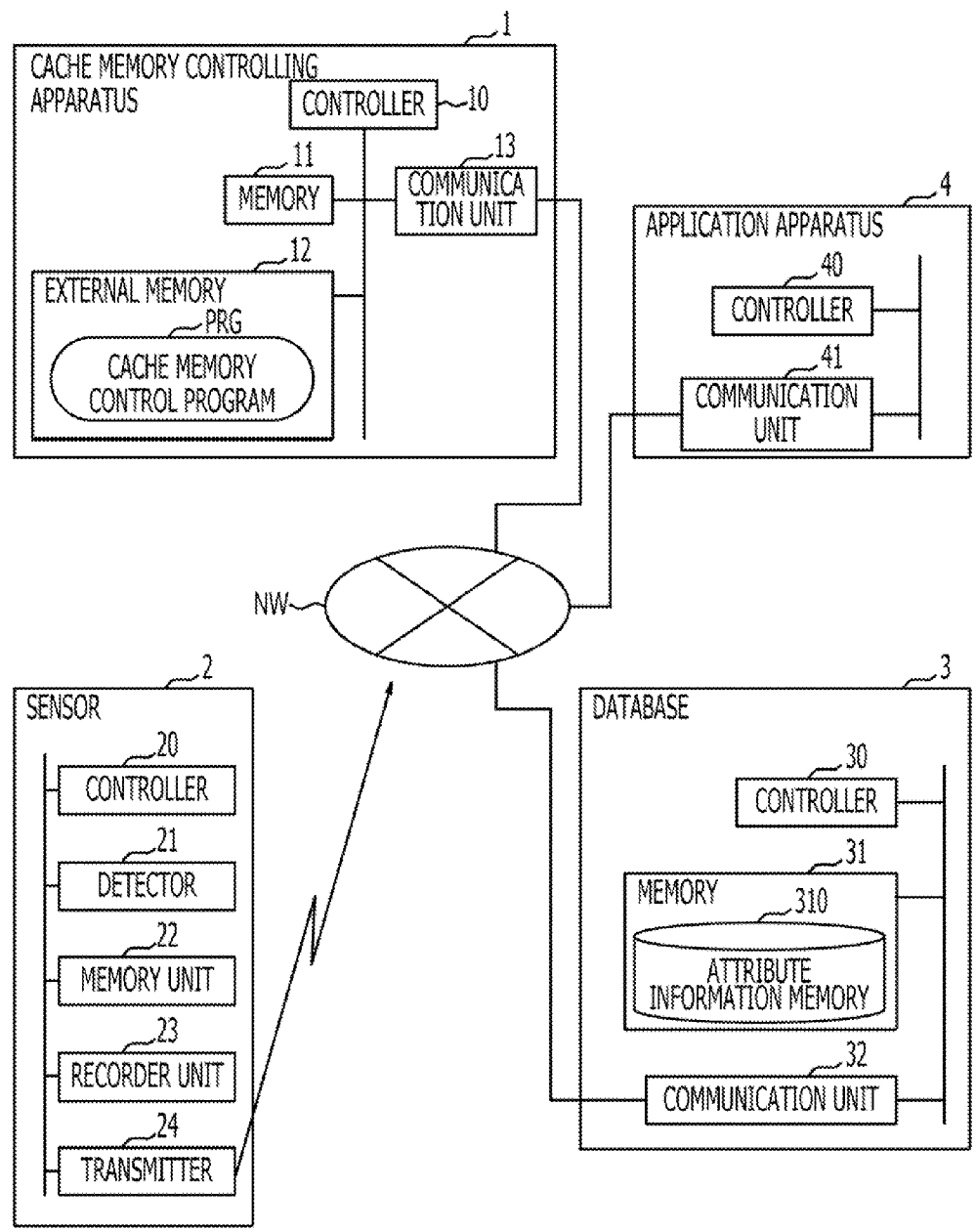
FIG. 2 illustrates a hardware structure of an apparatus included in the cache memory controlling system of the first embodiment.

A hardware configuration of the cache memory controlling system of the first embodiment is described below (FIG. 2). The cache memory controlling apparatus 1 includes controller 10, memory 11, external memory 12, and communication unit 13.

The controller 10 is a central processing unit (CPU) generally controlling the cache memory controlling apparatus 1. The controller 10 is connected to each hardware element in the cache memory controlling apparatus 1 via an internal communication line, and performs a process in accordance with a procedure of a program, e.g. a cache control program PRG or the like. The controller 10 includes a variety of circuits such as an instruction register, an instruction decoder, an arithmetic logic unit, an accumulator, an address register, and a program counter. The instruction register stores temporarily an instruction read from the memory 11. The instruction decoder decodes a machine instruction (binary) stored in the instruction register, and controls each mechanism of the cache memory controlling apparatus 1 in response to the instruction. The arithmetic logic circuit performs addition, subtraction, and comparison of values under the control of the instruction decoder. The accumulator temporarily stores information such as data as an arithmetic operation target, and results of the operation. The address register stores an address of a storage area of the memory 11 on which the controller 10 performs a write operation and a read operation. The program counter indicates an address of a storage area of the memory 11 where an instruction to be executed next is stored.

The memory 11 is a volatile main memory such as a synchronous dynamic random access memory (SDRAM), or a static random access memory (SRAM), for example.

The external memory 12 is an auxiliary non-volatile memory, e.g. a magnetic recording mechanism including a hard disk drive (HDD), or a semiconductor recording mechanism including a solid-state disk (SSD). The external memory 12 stores data and a variety of programs including a cache control program PRG. The control program PRG stored in the external memory 12 is loaded into the memory 11, and then executed under the control of the controller 10. The central apparatus 1 thus executes a variety of programs, and thus functions as the cache memory controlling apparatus 1. The memory 11 and the external memory 12 may be separately arranged for convenience. The memory 11 and the external memory 12 perform the function of recording a variety of information. Which memory to record the information is appropriately determined depending on the specifications and the operational configuration of the cache memory controlling apparatus 1.

The communication unit 13 includes a communication mechanism including hardware such as a connector to be connected to the communication network NW, a communication circuit, and software such as a driver, for example. The cache memory controlling apparatus 1 is connected to the communication network NW via the communication unit 13 and communicates with a variety of apparatuses including the sensor 2, the database 3, and the application apparatus 4.

The sensor 2 includes the controller 20, detector 21, memory unit 22, recorder unit 23, and transmitter 24. As previously discussed, the detector 21 may detect an ambient condition, and a condition of the sensor 2. The memory unit 22 stores detection data. The recorder unit 23 records a sensor ID uniquely identifying the sensor 2. The transmitter 24 sends the data and the sensor ID via the communication network NW. If the sensor 2 is of a continuous connection type device that sends the detection data on a real-time basis, the memory unit 22 is not necessarily arranged.

The database 3 includes controller 30, memory 31, and communication unit 32. The memory 31 may be an auxiliary storage mechanism such as a magnetic recording mechanism including HDD, or a semiconductor storage mechanism including SSD, for example. A recording area of the memory 31 serves as an attribute information memory 310 that records the sensor ID and the attribute information in a mapped state.

The application apparatus 4 includes a controller 40, and a communication unit 41. The application apparatus 4 with an application program thereof running or a circuit thereof in operation performs a variety of processes on data received from the cache memory controlling apparatus 1.

Figure 3:
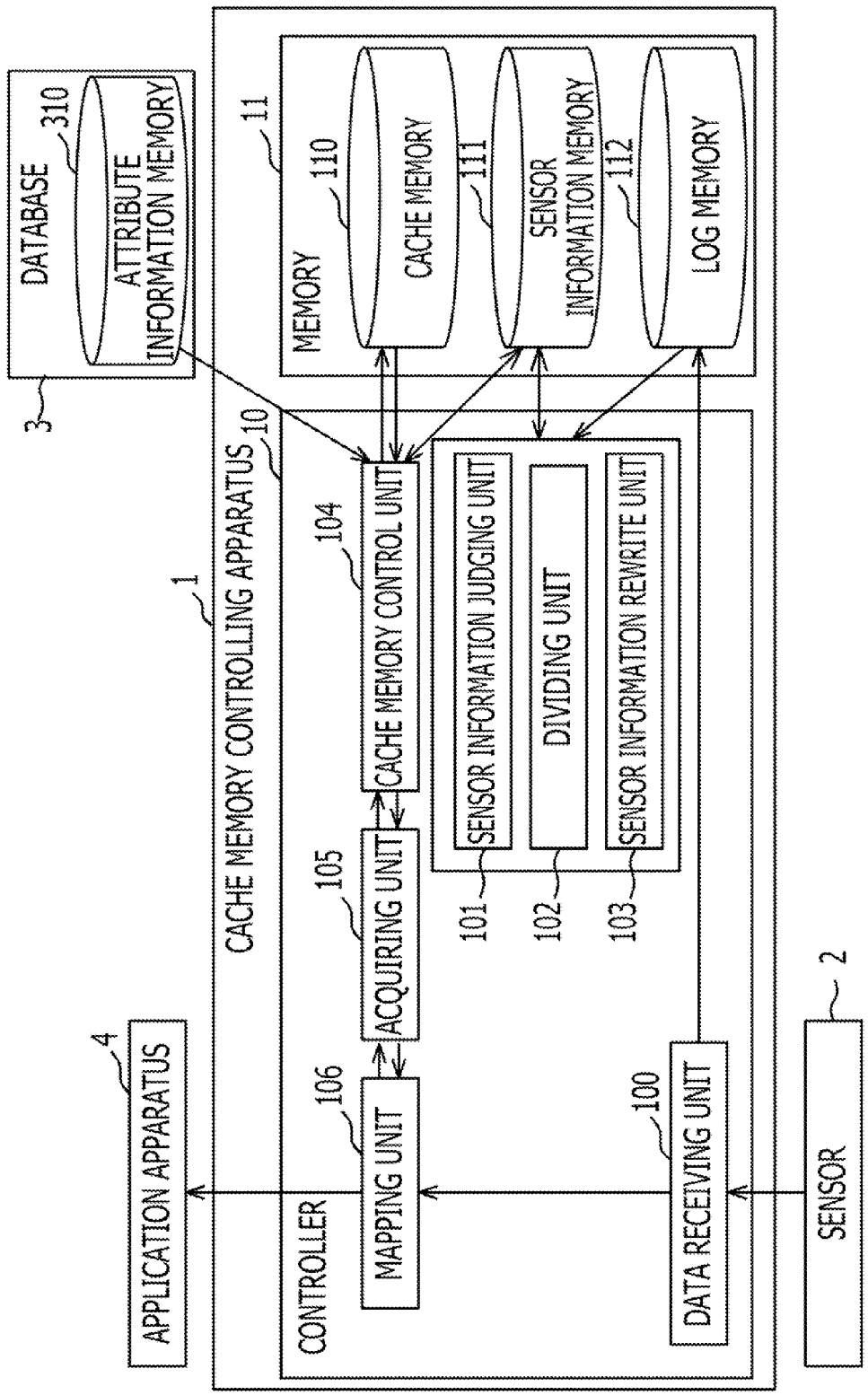
FIG. 3 illustrates a functional structure of the cache memory controlling system of the first embodiment.

FIG. 3 is a functional block diagram illustrating a structure of the cache memory controlling system of the first embodiment. The cache memory controlling apparatus 1 executes the cache control program PRG under the control of the controller 10, by performing functions thereof. The functions of the cache memory controlling apparatus 1 includes, for example, functions of data receiving unit 100, sensor information judging unit 101, dividing unit 102, sensor information rewrite unit 103, cache memory control unit 104, attribute information acquiring unit 105, and mapping unit 106. Instead of executing the cache control program PRG, the functions of the sensor information judging unit 101, the dividing unit 102, the sensor information rewrite unit 103, the cache memory control unit 104, the attribute information acquiring unit 105, and the mapping unit 106 may be incorporated into the circuit of the controller 10.

The data receiving unit 100 may be a program module or a circuit for causing the controller 10 to receive via the communication unit 13 the detection data detected by the detector 21 in the sensor 2 and the sensor ID identifying one of the sensor 2 and the detector 21 in the sensor 2.

The sensor information judging unit 101 may be a program module or a circuit for causing the controller 10 to judge whether the sensor 2 is a transmission source of the detection data, has a continuous connection type, or has an intermittent connection type.

The dividing unit 102 may be a program module or a circuit for causing the controller 10 to divide the detection data in a pre-process, prior to a judging process of the sensor information judging unit 101, into a plurality of groups.

The sensor information rewrite unit 103 may be a program module or a circuit for causing the controller 10 to rewrite a storage content on the sensor information memory 111 in response to judging results of the sensor information judging unit 101.

The cache memory control unit 104 may be a program module or a circuit for causing the controller 10 to acquire the attribute information from the attribute information memory 310 in the database 3, stores the acquired attribute information in the cache memory 110, or acquires the attribute information from the cache memory 110.

The attribute information acquiring unit 105 may be a program module or a circuit for causing the controller 10 to acquire the attribute information from one of the cache memory 110 and the attribute information memory 310 via the cache memory control unit 104.

The mapping unit 106 may be a program module or a circuit for causing the controller 10 to map the detection data received by the data receiving unit 100 to the attribute information acquired by the attribute information acquiring unit 105.

The cache memory controlling apparatus 1 may execute the cache control program PRG stored in the external memory 12 under the control of the controller 10, thus causing part of the storage area of the memory 11 to be available as information storage areas of the cache memory 110, the sensor information memory 111, and the log memory 112. Alternatively, the external memory 12 may be set to be available as information storage areas of the cache memory 110, the sensor information memory 111, and the log memory 112. Alternatively, the cache memory 110 may be arranged as an exclusive high-speed memory separate from the memory 11.

The cache memory 110 temporarily stores the acquired attribute information mapped to the sensor ID. The cache memory 110 reads, writes, and searches for data at a higher speed than the attribute information memory 310.

The sensor information memory 111 is a database storing information as to whether the sensor 2 is of a continuous connection type or an intermittent connection type.

The log memory 112 is a database storing log of the detection data received by the data receiving unit 100.

FIG. 4 illustrates an example of data stored in the cache memory 110 in the cache memory controlling apparatus 1 of the first embodiment. The cache memory 110 stores, by record unit, a variety of items of data, for example, including sensor ID, attribute information, storage period, and rewrite time mapped to each other. The sensor ID and the attribute information are acquired from the attribute information memory 310. The storage period refers to a period which the corresponding record remains stored. The record is deleted from the cache memory 110 at the moment the storage period starting at a rewrite time has elapsed. A storage period is always set for a record of the sensor 2 of the intermittent connection type, but not necessarily set for a record of the sensor 2 of the continuous connection type. The rewrite time refers to a time at which the attribute information has most recently been accessed by the cache memory control unit 104. The cache memory control unit 104 accesses the cache memory 110 to record or acquire the sensor ID and the attribute information. Each sensor ID may be linked to a subtraction timer, as detailed later, for example. A subtraction time counting starts in response to the rewrite time with the storage period set as an initial value. When the subtraction timer reaches "0," the corresponding record may be deleted from the cache memory 110.

FIG. 5 illustrates sensor information stored in the sensor information memory 111 in the cache memory controlling apparatus 1 of the first embodiment. The sensor information memory 111 stores by record unit a variety of items of data including, e.g. sensor ID and intermittent connection, that are mapped to each other. The intermittent connection is a flag indicating whether the sensor 2 identified by the sensor ID is of an intermittent type. Referring to FIG. 5, "YES" indicates the intermittent connection type and "NO" indicates another type different from the intermittent connection type.

FIG. 6 illustrates data stored in the log memory 112 in the cache memory controlling apparatus 1 of the first embodiment. The log memory 112 stores, by record unit, a variety of items of data including sensor ID, acquisition time, acquisition interval, for example, that are mapped to each other. The acquisition time refers to time at which the detection data sent from the sensor 2 and identified by the sensor ID has been acquired. The acquisition interval refers to time elapsed from the immediately preceding acquisition time if the detection data has been acquired by a plurality of times from the sensor 2 identified by the same sensor ID.

FIG. 7 illustrates data stored in the attribute information memory 310 in the database 3 in the cache memory controlling system 1 of the first embodiment. The attribute information memory 310 stores, by record unit, a variety of items of data including, for example, the sensor ID and the attribute information which are mapped to each other. Referring to FIG. 7, a single piece of attribute information is mapped to a single sensor ID. Alternatively, a plurality of pieces of attribute information may be mapped to a single sensor ID. In such a case, the cache memory 110 temporarily storing the record content of the attribute information memory 310 also stores the plurality of pieces of the attribute information mapped to the single sensor ID.

Figure 8:
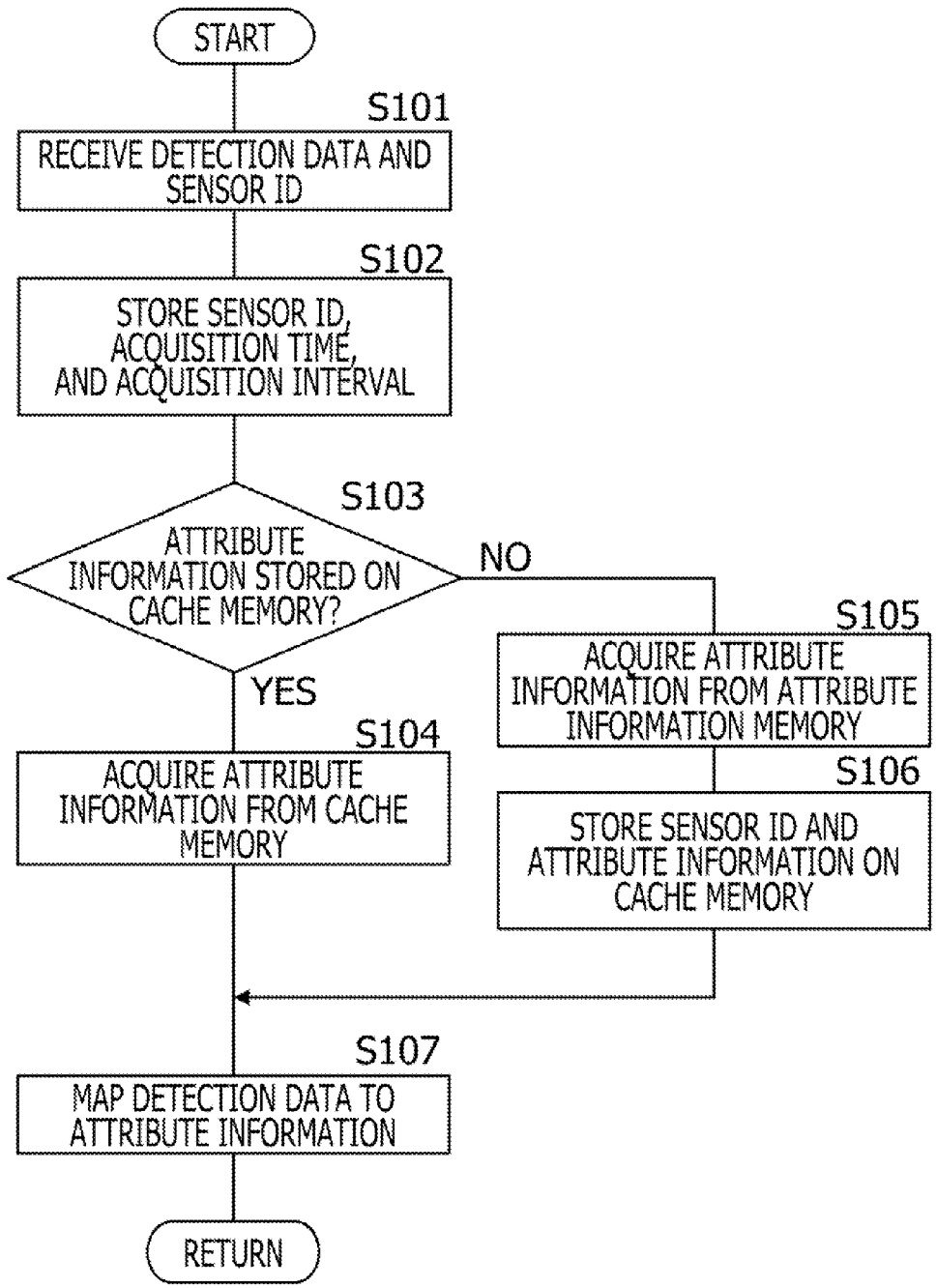
FIG. 8 is a flowchart illustrating an acquisition process and a mapping process of the attribute information performed by the cache memory controlling apparatus of the first embodiment.

FIG. 8 is a flowchart illustrating an acquisition process and a mapping process of the attribute information performed by the cache memory controlling apparatus 1 of the first embodiment. The mapping process of the first embodiment is to map the detection data to the attribute information and to organize the data such that the data is used by the application apparatus 4.

Before discussing the mapping process of the cache memory controlling apparatus 1, a process of the sensor 2 sending the detection data to the cache memory controlling apparatus 1 is described. The sensor 2 under the control of the controller 20 sends the detection data and the sensor ID uniquely identifying the sensor 2 from the transmitter 24 to the cache memory controlling apparatus 1 via the communication network NW. If the sensor 2 is of the continuous connection type, the sensor 2 sends the detection data and the sensor ID to the cache memory controlling apparatus 1 every specified period or each time a detection process is triggered. If the sensor 2 is of the intermittent connection type, the sensor 2 stores successively the detection data in the memory unit 22. While being connected to the communication network NW, the sensor 2 sends in burst the detection data and sensor ID stored in the memory unit 22 to the cache memory controlling apparatus 1. If the sensor 2 of the intermittent connection type sends the detection data and the sensor ID in burst, a data transmission process is repeated at specified time intervals such as 100 ms until all the detection data is sent.

The cache memory controlling apparatus 1, under the control of the controller 10 executing the cache control program PRG, repeats the following process each time the reception of the detection data and the sensor ID is detected or with a specified or given period.

The controller 10 acquires the detection data and the sensor ID each time the data receiving unit 100 detects the reception of the detection data and the sensor ID via the communication unit 13 (operation S101).

The controller 10 causes the cache memory 110 to store the sensor ID received by the data receiving unit 100, the acquisition time and the acquisition period (operation S102). The acquisition time typically refers to the time at which the data receiving unit 100 receives the detection data. Alternatively, the acquisition time may be the time at which the detection data is stored. If header information of the detection data and the sensor ID includes the transmission time at which the sensor 2 has sent the detection data, the transmission time may be stored as the acquisition time.

The data receiving unit 100 transfers the detection data and the sensor ID to the mapping unit 106. The mapping unit 106 requests the attribute information acquiring unit 105 to acquire the attribute information corresponding to the received sensor ID. The attribute information acquiring unit 105 inquires of the cache memory control unit 104 about the attribute information corresponding to the sensor ID.

The cache memory control unit 104 in the cache memory controlling apparatus 1 references the cache memory 110 and judges in response to the sensor ID whether the corresponding attribute information is stored (operation S103). In operation S103, the cache memory control unit 104 searches for the attribute information with the sensor ID as a search key. If a record including the corresponding sensor ID is stored, the cache memory control unit 104 judges that the attribute information corresponding to the sensor ID served as a search key is stored in the record.

If it is determined in operation S103 that the corresponding attribute information is stored (yes branch from operation S103), the cache memory control unit 104 in the controller 10 acquires the attribute information from the cache memory 110 (operation S104). The cache memory control unit 104 then transfers the acquired attribute information to the attribute information acquiring unit 105. When the attribute information is acquired from the cache memory 110 in operation S104, the cache memory control unit 104 updates a rewrite time each time the attribute information has been accessed.

If it is determined in operation S103 that the attribute information is not stored (no branch from operation S103), the cache memory control unit 104 in the controller 10 acquires the attribute information from the attribute information memory 310 in the database 3 (operation S105), and stores the attribute information and the sensor ID in the cache memory 110 (operation S106). In operation S105, the cache memory control unit 104 in the controller 10 accesses the database 3 via the communication network NW and acquires the attribute information from the attribute information memory 310 in the database 3. The cache memory control unit 104 transfers the acquired attribute information to the attribute information acquiring unit 105. In operation S106, the controller 10 stores in the cache memory 110 a new record mapped to the attribute information acquired from the attribute information memory 310 and the sensor ID. The time at which the sensor ID and the attribute information are stored as the new record is also stored as the rewrite time in the record.

The cache memory control unit 104 transfers the attribute information to the attribute information acquiring unit 105.

The attribute information acquiring unit 105 then transfers the attribute information to the mapping unit 106.

The mapping unit 106 in the controller 10 maps the detection data received by the data receiving unit 100 to the acquired attribute information (operation S107). The attribute information handled in operation S107 is the attribute information acquired from the cache memory 110 or the attribute information memory 310 in response to the sensor ID. A mapping format is appropriately set in accordance with the application apparatus 4 as a transmission destination. The mapped detection data and attribute information is sent to the application apparatus 4 via the communication network NW. The application apparatus 4 performs a variety of processes on the detection data and the attribute information.

If the application apparatus 4 as a transmission destination is different depending on the detection data, the formats are organized in accordance with the application apparatuses 4, and the detection data is sorted according the application apparatus 4. A single piece of detection data may be sorted to a plurality of application apparatuses 4. The mapping process is thus performed in accordance with the first embodiment.

Figure 9:
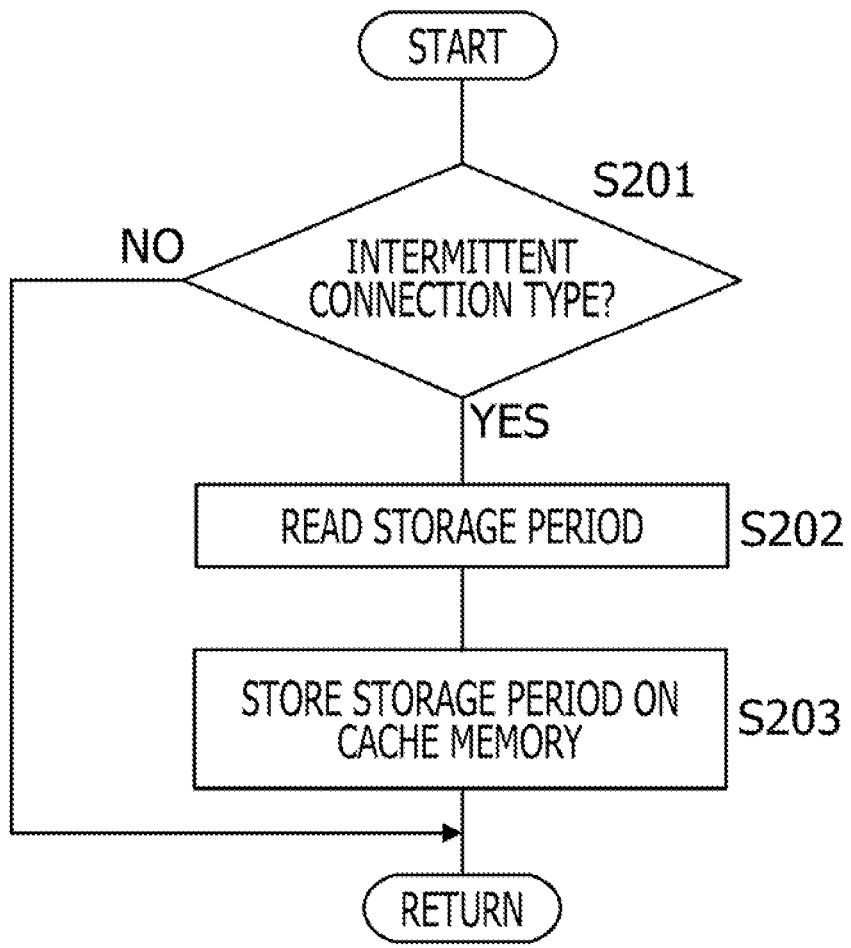
FIG. 9 is a flowchart illustrating a cache memory control process of the cache memory controlling apparatus of the first embodiment.

FIG. 9 is a flowchart illustrating a cache memory control process of the cache memory controlling apparatus 1 of the first embodiment. In the cache memory control process, a variety of data to be stored in the controller 10 is controlled. In response to the reception of the detection data, the cache memory controlling apparatus 1 repeats the cache memory control process on the sensor ID related to the received detection data and the record including the sensor ID, in parallel with the above-described mapping process. The cache memory controlling apparatus 1 under the control of the controller 10 performing the cache control program PRG performs on each record as a process target a process described below.

The cache memory control unit 104 in the controller 10 references the sensor information memory 111 to judge whether the sensor 2 identified by the sensor ID related to the process target is of the intermittent connection type (operation S201). In operation S201, the controller 10 searches for the record stored on the cache memory control unit 104 with the sensor ID as a search key, and then judges whether a flag indicating the intermittent connection of the record indicates the intermittent connection type.

If it is determined in operation S201 that the sensor 2 is of the intermittent connection type (yes branch from operation S201), the cache memory control unit 104 in the controller 10 reads the storage period set on the sensor information memory 111 (operation S202). In operation S202, the cache memory control unit 104 reads a value stored as the storage period on the record used for judgment in operation S201.

The cache memory control unit 104 in the controller 10 stores the read storage period onto the cache memory 110 (operation S203) and the processing thus ends. In operation S203, the cache memory 110 is searched for with the sensor ID mapped to the read storage period and serving as a search key. The cache memory control unit 104 sets the value read from the sensor information memory 111 as the storage period corresponding to the sensor ID. If a value is already set as a storage period, the value of the storage period is rewritten. Rather than rewriting the storage period, the existing value may be used.

If it is determined in operation S201 that the sensor 2 is not of the intermittent connection type (no branch from operation S201), the controller 10 ends the process thereof without performing operations S202 and S203. In the case of the continuous connection type, the storage time may be rewritten. The cache memory control process of the first embodiment is thus performed.

Figure 10:
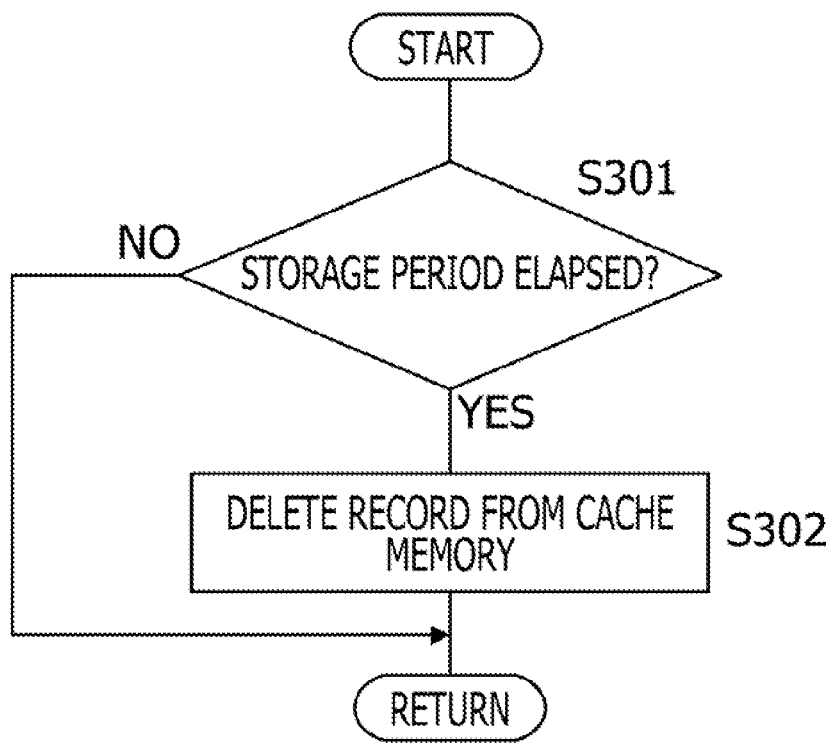
FIG. 10 is a flowchart illustrating a cache memory deletion process of the cache memory controlling apparatus of the first embodiment.

FIG. 10 is a flowchart illustrating a cache memory deletion process of the first embodiment. In the cache memory deletion process of the first embodiment, a record with the storage period having elapsed, among the records stored on the cache memory 110, is deleted. This memory deletion process is performed on each of the records stored on the cache memory 110. The cache memory controlling apparatus 1 under the control of the controller 10 executing the cache control program PRG performs a process described below on each record stored on the controller 10 independent of and in parallel with the above-described mapping process and the cache memory control process.

The controller 10 references the data receiving unit 100 to judge whether the storage period of each record has elapsed (operation S301). In operation S301, a deletion time is calculated from the storage period and the rewrite time of the record stored on the cache memory 110. If the controller 10 judges that the deletion time is exceeded, it is determined that the storage period has elapsed.

If it is determined in operation S301 that the storage period has elapsed (yes branch from operation S301), the controller 10 deletes the record from the cache memory 110 (operation S302), and ends the process on the process target.

If it is determined in operation S301 that the storage period has not elapsed (no branch from operation S301), the controller 10 ends the process thereof without performing operation S302.

Instead of calculating the deletion time from the storage period and the rewrite time, the controller 10 may include a plurality of subtraction timers to be used in the cache memory control process. The plurality of subtraction timers are mapped to respective records. More specifically, when the storage period is stored on the cache memory 110, the subtraction timer is initiated with the storage period serving as an initial value. The moment the subtraction timer reaches "0," the record mapped to the subtraction timer is deleted. With the subtraction timer, the count of the subtraction timer is reset to the value indicated by an effective time each time the storage period is rewritten, or the cache memory 110 is accessed in a read process to read the attribute information. A subtraction time counting process then re-starts. The cache memory deletion process of the first embodiment is thus performed.

Figure 11:
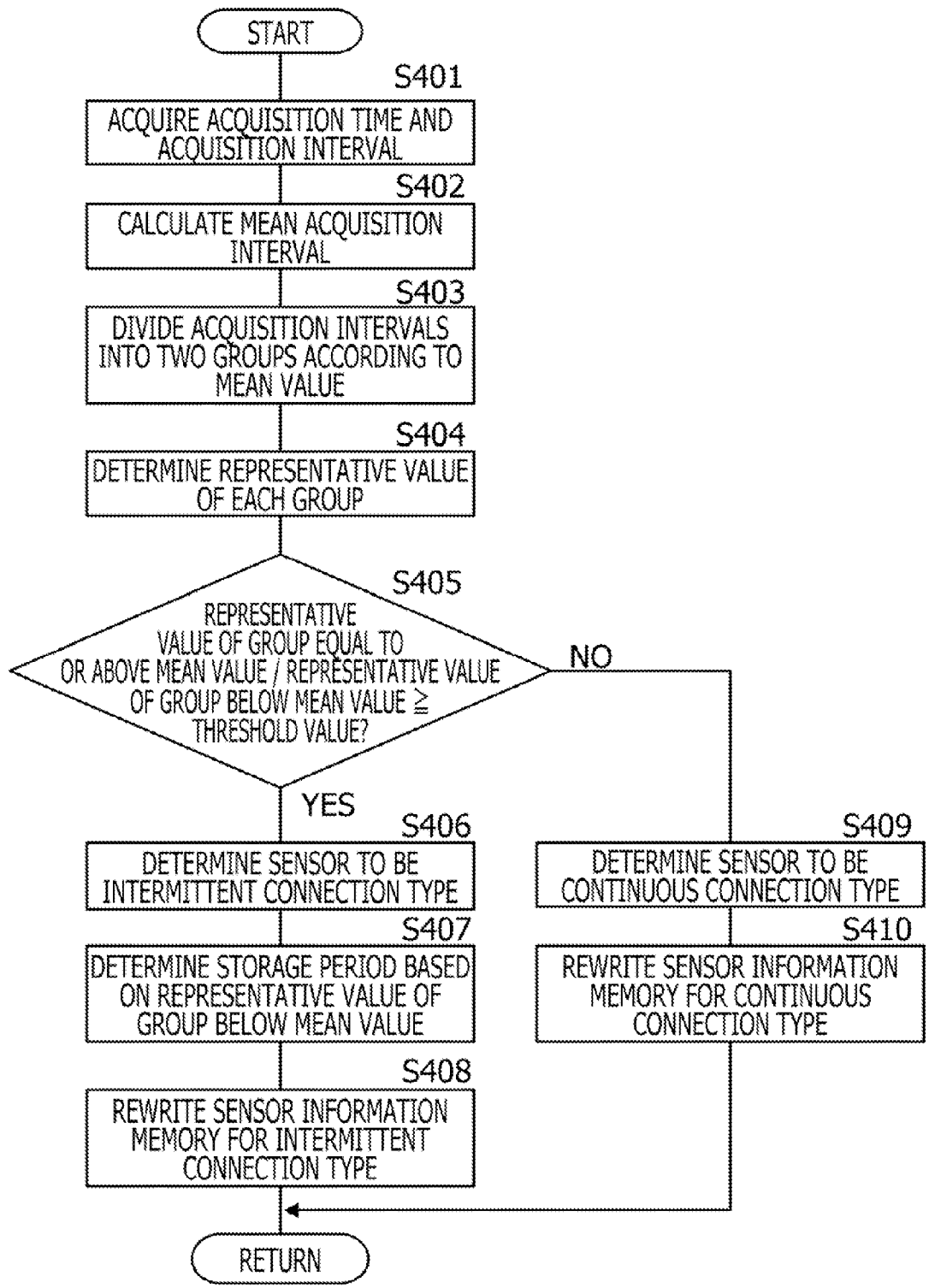
FIG. 11 is a flowchart illustrating a rewrite process of the sensor information performed by the cache memory controlling apparatus of the first embodiment.

FIG. 11 is a flowchart illustrating a sensor information rewrite process of the cache memory controlling apparatus 1 of the first embodiment. In the sensor information rewrite process, the storage period is set on the cache memory 110 if the sensor 2 is determined to be of the intermittent connection type. If the sensor 2 is of the switch type of being switched between the continuous connection and the intermittent connection, the sensor information on the sensor information memory 111 is dynamically modified. The dynamic modification of the sensor information is effective if the intermittent period of the sensor 2 is varied. The cache memory controlling apparatus 1 repeats an intermittent judging process at a specified time interval such as 10 ms, 1 minute, 10 minutes, or 1 hour, independent of and in parallel with the mapping process, the cache memory control process, and the cache memory deletion process. The cache memory controlling apparatus 1 under the control of the controller 10 executing the cache control program PRG performs the process described below.

The controller 10 acquires the acquisition time and the acquisition interval included in the record corresponding to the sensor ID using the sensor ID, as a process target, serving as a search key (operation S401). In operation S401, the sensor ID as the process target is selected from the log memory 112 in accordance with a specific method. Optionally, only the value of the acquisition interval may be acquired.

FIG. 12 conceptually illustrates values acquired in the sensor information rewrite process. FIG. 12 illustrates the acquisition time and the acquisition interval, acquired in operation S401, and the sensor ID mapped to each other. The sensor 2 having a sensor ID of "001" in FIG. 12 is of the intermittent connection type. In a portion of the acquisition intervals of the sensor 2, the detection data is received at intervals of 100 ms in burst. The portion of the acquisition intervals is considered to be a transmission enable period during which the sensor 2 is connected to the communication network NW and sends the detection data. In comparison with the transmission enable period, a portion of the acquisition intervals such as "179800 ms" and "119800 ms" is present and considered to be a transmission disable period.

In the flowchart of FIG. 11 again, the dividing unit 102 in the controller 10 sums the values of acquisition intervals, and calculates the mean value of the values (operation S402). Referring to FIG. 12, the mean value "42871 ms" is determined.

The dividing unit 102 in the controller 10 divides the values of the acquisition intervals in a log into two groups according to the mean value of the acquisition intervals, one group substantially equal to or above the mean value and the other group below the mean value (operation S403). A representative value of each group, for example, the mean value of each group is calculated (operation S404). Referring to FIG. 12, the group mean value of the group equal to or above the mean value is "149800 ms" and the group mean value of the group below the mean value is "100 ms." The representative value of each group is not limited to the mean value of each group. The representative value of each group may be a median value, or a mode value. The mean value of each group, if used, is not limited to an arithmetic mean value but may be another mean value such as a harmonic mean value, or a geometrical mean value.

The sensor information judging unit 101 in the controller 10 judges whether the ratio of the representative value of the group substantially equal to or above the mean value to the representative value of the group below the mean value is substantially equal to or above a specific threshold value such as 100 (operation S405). In the example of FIG. 12, the ratio of the representative value of the group equal to or above the mean value to the representative value of the group below the mean value is 149800:100=1498, and the controller 10 judges that the representative value ratio is equal to or above 100 as the specific threshold value. The judging condition in operation S405 is not limited to the ratio. For example, the judging condition may be a difference equal to or above 600000 ms.

If it is determined in operation S405 that the ratio is substantially equal to or above the specific threshold value (yes branch from operation S405), the sensor information judging unit 101 in the controller 10 judges that the sensor 2 having the sensor ID as the process target is of the intermittent connection type (operation S406). In operation S406, the distributions of the acquisition intervals are distinctly divided into to the two groups, and this indicates that the acquisition intervals are divided into the transmission enable period and the transmission disable period.

The controller 10 has judged that the sensor 2 is of the intermittent connection type. The sensor information rewrite unit 103 in the controller 10 determines the storage period of the cache memory 110 based on the representative value of the group below the mean value (operation S407). If the sensor 2 is judged to be of the intermittent connection type, it may be estimated that the representative value of the group below the mean value is a transmission interval in the transmission enable period. In operation S407, the storage period is determined based on the transmission interval in the transmission enable period. Set as the storage period is twice the representative value of the group below the mean value, e.g., twice the transmission interval in the transmission enable period. Referring to FIG. 12, the group mean value of the group substantially equal to or above the mean value is "149800 ms", and the group mean value of the group below the mean value is "100 ms."

The controller 10 has determined the storage period. The sensor information rewrite unit 103 in the controller 10 updates the storage content of the sensor information memory 111 for the intermittent connection type (operation S408). The controller 10 thus ends the process thereof on the process target. In operation S408, a rewrite process is performed such that the value of the item of the intermittent connection mapped to the sensor ID as the process target is set be a flag indicating a sensor of the intermittent connection type, and such that the value of the item of storage period is set to be the storage period determined in operation S407.

If it is determined in operation S405 that the ratio is below the specific threshold value (no branch from operation S405), the sensor information judging unit 101 in the controller 10 judges that the sensor 2 having the sensor ID as a process target is of the continuous connection type (operation S409). In operation S409, the controller 10 has difficulty judging that the distributions of the acquisition intervals are distinctly divided into the two groups, and thus judges that the sensor 2 is of the continuous connection type.

The controller 10 has determined that the sensor 2 is of the continuous connection type. The sensor information rewrite unit 103 in the controller 10 rewrites the storage content of the sensor information memory 111 with the sensor 2 being as the continuous connection type (operation S410). The controller 10 thus ends the process thereof on the process target. In operation S410, the rewrite process is performed such that the value of the item of the intermittent connection mapped to the sensor ID as the process target is set be a flag indicating a sensor of a type other than the intermittent connection type, and such that the value of the item of storage period is set to be "blank" or "null" indicating blank.

The above-described intermittent judging process automates a scan related to a variety of settings of intermittent connection, thereby leading to work saving. If the variety of settings is set to be fixed, the mapping process, the cache memory control process, and other processes may be executed without executing the intermittent judging process. The intermittent judging process of the first embodiment is thus performed.

In the cache memory controlling system discussed heretofore, the cache memory storage period is set for a variety of information related to the sensor 2 of the intermittent connection type in accordance with a shorter transmission interval in the transmission enable period. During the transmission enable period of the sensor 2 of the intermittent connection type, a cache memory area is maintained. After the elapse of the transmission enable period, the cache memory area is deleted. This arrangement may prevent the cache memory 110 from being occupied by the variety of information related to the sensor 2 during the transmission disable period of the sensor 2 of the intermittent connection type, thus avoiding a performance drop. During the transmission enable period of the sensor 2 of the intermittent connection type, the cache memory 110 is used to process the detection data transmitted in burst, and no decrease in performance is caused.

The cache memory controlling system of the present application automatically judges in the intermittent judging process whether the sensor 2 is of the intermittent connection type. If the sensor 2 is of the intermittent connection type, the storage period of the cache memory 110 is dynamically rewritten. Accordingly, a workload of a person in charge of the management and update of information related to an intermittent connection is reduced. For example, a setting is automatically modified on the sensor 2 of the switching type which is set up for the continuous connection during daylight time with priority placed on immediacy and is set up for the intermittent connection during nighttime with priority placed on power saving.

In a second embodiment, the specific threshold value used in the intermittent judging process of the first embodiment of judging whether the sensor 2 is of the intermittent connection type is dynamically modified depending on the storage status of the cache memory 110. In the second embodiment, elements identical to those in the first embodiment are designated with the same reference numerals and the discussion thereof is omitted here. Reference may be made back to the discussion of the first embodiment. The hardware structure of the cache memory controlling system of the second embodiment is similar to that of the first embodiment, and the discussion thereof is omitted here.

Figure 13:
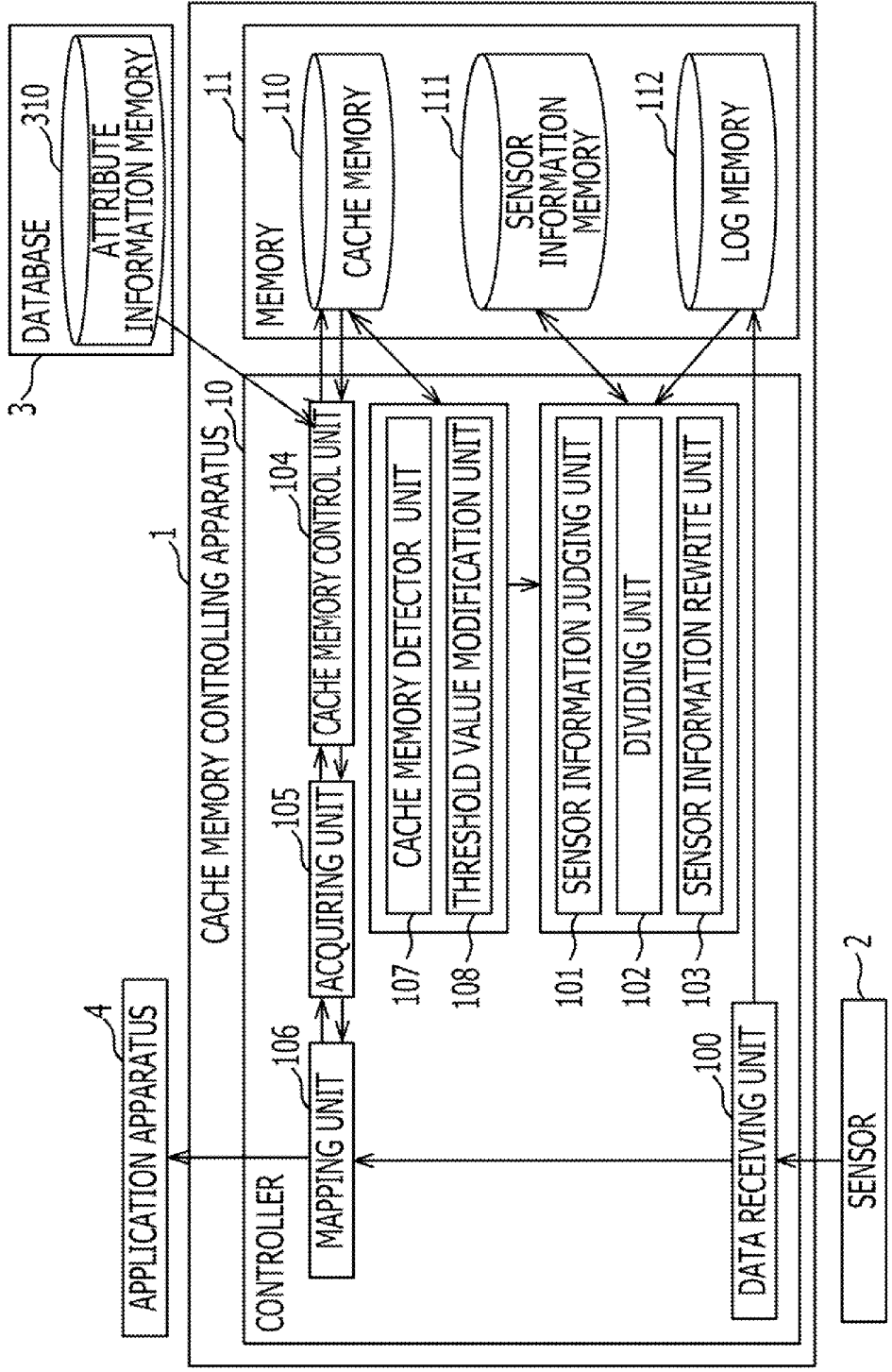
FIG. 13 illustrates a functional structure of a cache memory controlling system of a second embodiment.

A functional structure of the cache memory controlling system of the second embodiment is described. FIG. 13 is a functional block diagram of the cache memory controlling system of the second embodiment. The cache memory controlling apparatus 1 performs functions thereof by executing the cache control program PRG under the control of the controller 10. The functions of the cache memory controlling apparatus 1 includes functions of the data receiving unit 100, the sensor information judging unit 101, the dividing unit 102, the sensor information rewrite unit 103, the cache memory control unit 104, the attribute information acquiring unit 105, the mapping unit 106, the cache memory detector 107, and the threshold value modification unit 108, for example. Rather than executing the cache control program PRG, the controller 10 may include circuits that performs the functions of the data receiving unit 100, the sensor information judging unit 101, the dividing unit 102, the sensor information rewrite unit 103, the cache memory control unit 104, the attribute information acquiring unit 105, the mapping unit 106, the cache memory detector 107, and the threshold value modification unit 108, for example.

The cache memory detector 107 may be a program module or a circuit for causing the controller 10 to detect a storage status of the cache memory 110.

The threshold value modification unit 108 may be a program module or a circuit for the controller 10 to modify a specific threshold value in the intermittent judging process of judging whether the sensor 2 is of the intermittent connection type.

The remainder of the second embodiment is substantially identical to the first embodiment, and the discussion thereof is omitted herein.

The cache memory controlling system of the second embodiment is discussed below. The mapping process, the cache memory control process, the cache memory deletion process, and the intermittent judging process of the second embodiment are substantially identical to the first embodiment counterparts, and the discussion thereof is omitted here. Reference may be made back to the discussion of the first embodiment.

Figure 14:
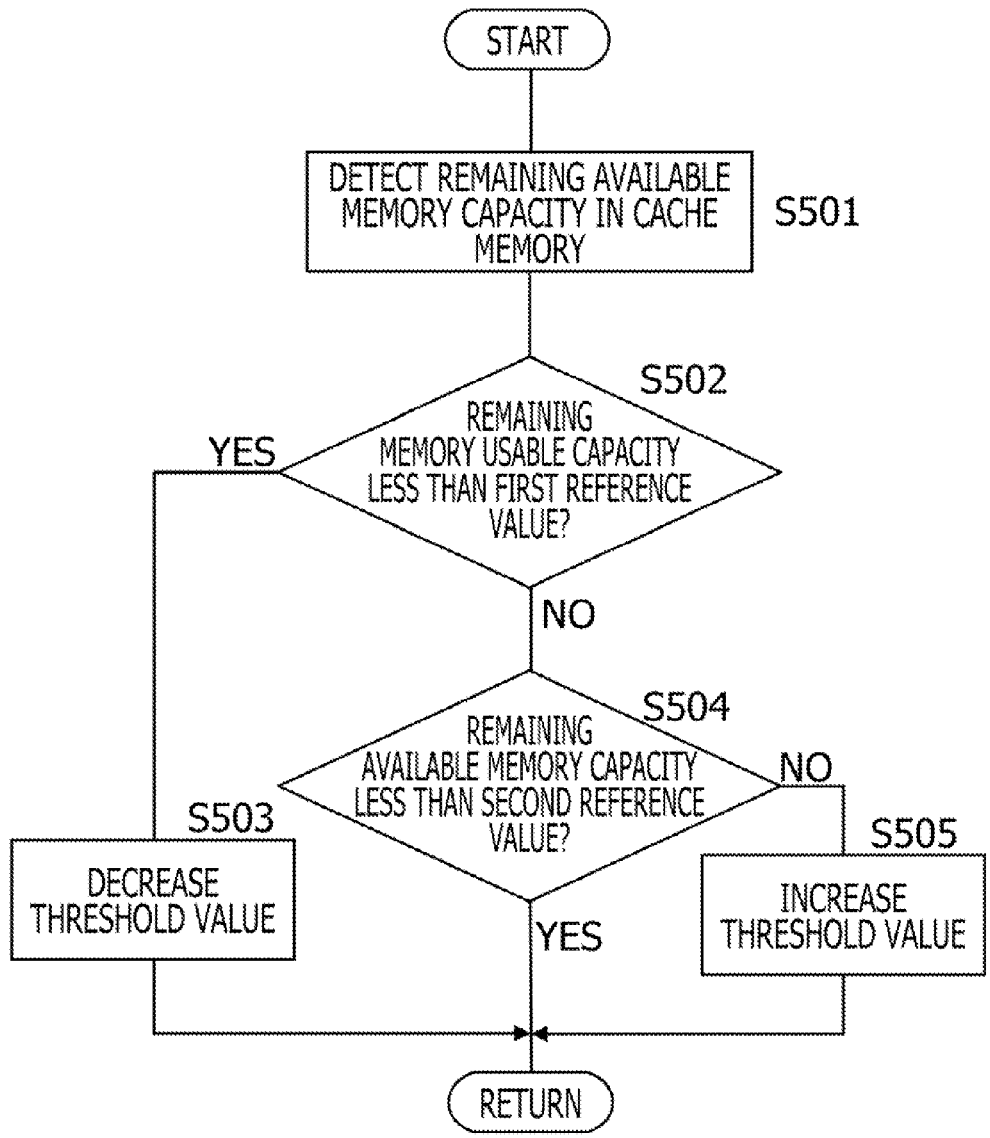
FIG. 14 is a flowchart illustrating a threshold rewrite process of the cache memory controlling apparatus of the second embodiment.

FIG. 14 is a flowchart illustrating a threshold value modification process of the cache memory controlling apparatus 1 of the second embodiment. The cache memory controlling apparatus 1 of the second embodiment starts the threshold value modification process in response to the cache process where the sensor ID and the attribute information are stored on the cache memory 110 in operation S106 of the mapping process. The cache memory controlling apparatus 1 of the second embodiment under the control of the controller 10 executing the cache control program PRG performs on each record a process described below.

The controller 10 has stored the sensor ID and the attribute information in the cache memory 110. The cache memory detector 107 in the controller 10 detects a ratio of a remaining available memory capacity to the overall memory capacity of the cache memory 110 (operation S501).

The threshold value modification unit 108 in the controller 10 judges whether the remaining available memory capacity is less than a first reference value, for example, 30% as a preset value (operation S502).

If it is determined in operation S502 that the remaining available memory capacity is less than the first reference value (yes branch from operation S502), the threshold value modification unit 108 in the controller 10 performs the modification process to reduce the threshold value used in the intermittent judging process by a specific percentage such as 10% (operation S503). The controller 10 then ends the process thereof. In operation S503, a reduction of the threshold value with a small remaining available memory capacity allows the sensor 2 to be likely judged to be of the intermittent connection type. A short storage period is likely to be set, and the storage area of the cache memory 110 is effectively used.

If it is determined in operation S502 that the remaining available memory capacity is substantially equal to or above the first reference value (no branch from operation S502), the threshold value modification unit 108 in the controller 10 judges whether the remaining available memory capacity detected in operation S501 is less than a second preset reference value, for example, 70% (S504).

If it is determined in operation S504 that the remaining available memory capacity is less than the second reference value (yes branch from operation S504), the controller 10 ends the process thereof without updating the threshold value. This is because the controller 10 determines that the threshold value is appropriate for the cache memory 110 and desires no modification.

If it is determined in operation S504 that the remaining available memory capacity is substantially equal to or above the second reference value (no branch from operation S504), the threshold value modification unit 108 in the controller 10 performs the modification process to increase the threshold value used in the intermittent judging process by a specific percentage, for example, 10% (operation S505). The controller 10 then ends the process thereof. In operation S505, an increase of the threshold value with a large remaining available memory capacity allows the sensor 2 to be less likely judged to be of the intermittent connection type. The possibility of an erroneous judgment that the sensor 2 of the intermittent connection type is not the intermittent connection type is thus reduced. A drop in performance may be prevented.

The above-described first and second reference values may be an absolute memory capacity such as 1 Mbytes rather than the ratio. For example, an increase in the threshold value may be set to 128 Kbytes during the modification of the threshold value. In the first embodiment, the threshold values are used to divide the remaining available memory capacities into three regions. The present application is not limited to the three-region setting. The remaining memory capacities may be divided into four regions, and a variety of modification methods may be implemented. For example, the degree of modification of the threshold value may be set to be different dependent on the remaining available memory capacity.

The above-described threshold modification process allows an appropriate threshold value to be dynamically set in accordance with the remaining available memory capacity of the cache memory 110. Performance drop is generally controlled. The threshold modification process of the second embodiment is thus performed.

In accordance with a third embodiment, a period within which the acquisition time and the acquisition interval are effective is dynamically set in the intermittent judging process of the first embodiment. In the third embodiment, elements identical to those of the first embodiment are designated with the same reference numerals and the discussion thereof is omitted here. Reference may be made back to the discussion of the first embodiment. The hardware structure, and the functional structure of a the cache memory controlling system remain unchanged from those of the cache memory controlling system of the first embodiment, and the discussion thereof is omitted here. Reference may be made back to the discussion of the first embodiment.

A process of the control system of the third embodiment is described below. A mapping process, a cache memory control process, and a cache memory deletion process of the third embodiment are substantially identical to the first embodiment counterparts, and reference may be made back to the discussion of the first embodiment.

Figure 15:
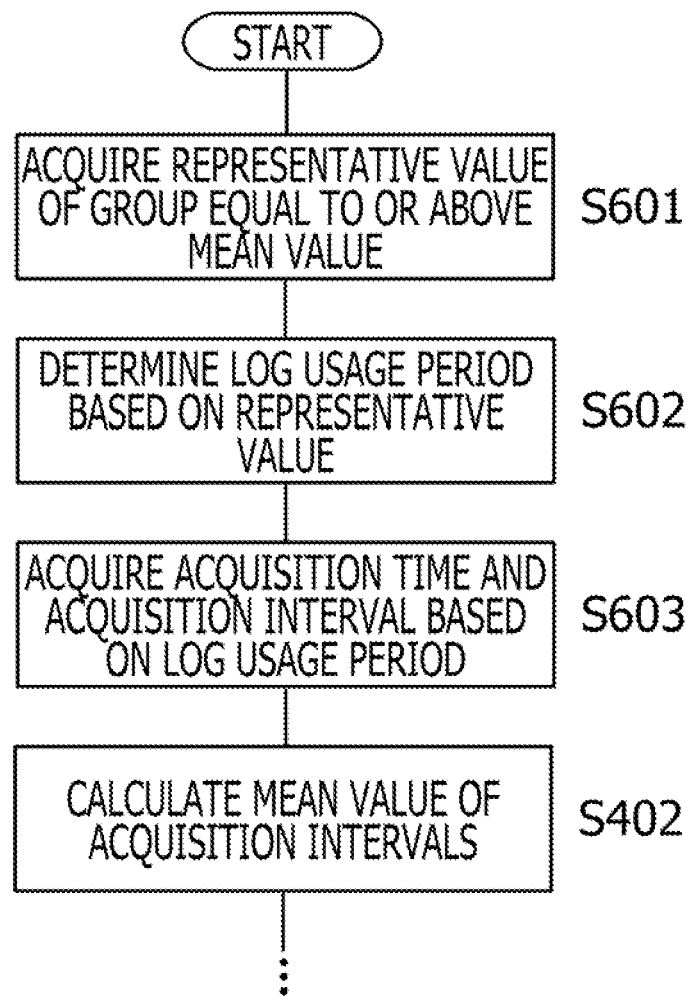
FIG. 15 is a flowchart illustrating a sensor information rewrite process of a cache memory controlling apparatus of a third embodiment.

FIG. 15 is a flowchart illustrating a sensor information rewrite process of the cache memory controlling apparatus 1 of the third embodiment. The cache memory controlling apparatus 1 of the third embodiment under the control of the controller 10 executing the cache control program PRG performs a process described below.

The controller 10 acquires the representative value, such as the mean value, of the group substantially equal to or above the mean value calculated in operation S404 during the execution of the preceding intermittent judging process (operation S601). The preceding results are temporarily stored on an area reserved on the memory 11 as described later.

The controller 10 determines a log usage period based on the acquired representative value of the group substantially equal to or above the mean value (operation S602). In operation S602, three times the mean value of the group substantially equal to or above the mean value is determined as a log usage period.

The controller 10 acquires the values of the acquisition time and the acquisition period included in the record related to the sensor ID, as a process target, serving as a search key, from the log within the log usage period down to the current time stored on the log memory 112 (operation S603). The process operation in operation S603 and the process operation in operation S401 in the intermittent judging process of the first embodiment appear similar but are slightly different from each other in that the process operation in S603 is subject to the limitation of the period where the values of the acquisition time and the acquisition interval are acquired from the period set based on the usage period determined in operation S602.

For example, the representative value of the group substantially equal to or above the mean value determined in the preceding intermittent judging process is "149800 ms" and a value three times the representative value, namely, "449400 ms" is determined to be the usage period. The log within about 450 seconds down to the acquisition time serves the acquisition target from which the log is acquired. For example, in the example of FIG. 12 in the first embodiment, a process time in operation S506 is "9:10.00.000," and records having the acquisition time "9:03.00.000" or later serve as acquisition targets.

The cache memory controlling apparatus 1 under the control of the controller 10 executing the cache control program PRG executes operation S402 and subsequent operations in the intermittent judging process of the first embodiment. If the cache memory controlling apparatus 1 judges that the sensor 2 is of the intermittent connection type, the representative value of the group substantially equal to or above the mean value determined in operation S404 is stored on the memory 11. The representative value stored on the memory 11 is intended to be used in the determination of a next usage period.

The intermittent judging process thus optimizes the log usage period. If the acquisition interval is long, for example, a log usage period three times the representative value, the set log period may include the transmission enable period of the intermittent connection. Appropriate log allowing a reliable and effective period to be set may be acquired. The intermittent judging process of the third embodiment is thus performed.

A fourth embodiment is different from the first embodiment in that information to be stored is cached on the cache memory 110 and access status to the cache memory 110 subsequent to the caching is referenced to judge that the sensor 2 is not of the intermittent connection type. In the fourth embodiment, elements substantially identical to those in the first embodiment are designated with the substantially the same reference numerals, and the discussion thereof is omitted. Reference may be made back to the discussion of the first embodiment. A hardware structure of a cache memory controlling system of the fourth embodiment is substantially identical to those of the cache memory controlling system of the first embodiment, and the discussion thereof is omitted here. Reference may be made back to the discussion of the first embodiment.

A functional structure of the cache memory controlling system of the fourth embodiment is described below. The functional structure of the cache memory controlling system of the fourth embodiment is different from the functional structure of the cache memory controlling system of the first embodiment in a storage content of the cache memory 110. As for the functional structure of the fourth embodiment, only the storage content of the cache memory 110 is described and for the remainder of the functional structure, reference may be made back to the discussion of the first embodiment.

FIG. 16 illustrates and example of the storage content of the cache memory 110 of the cache memory controlling apparatus 1 of the fourth embodiment. The cache memory 110 stores, by record unit, a variety of items of data including sensor ID, attribute information, storage period, reacquisition status, rewrite time, for example. The reacquisition status is a flag that indicates whether the attribute information temporarily stored is re-acquired as cache data. "NO" is listed with the attribute information temporarily stored, and "YES" is listed with the attribute information re-acquired.

The control system of the fourth embodiment is described below. A mapping process and an intermittent judging process of the fourth embodiment are substantially identical to the first embodiment counterparts, and the discussion thereof is omitted here. Reference may be made back to the discussion of the first embodiment.

Figure 17:
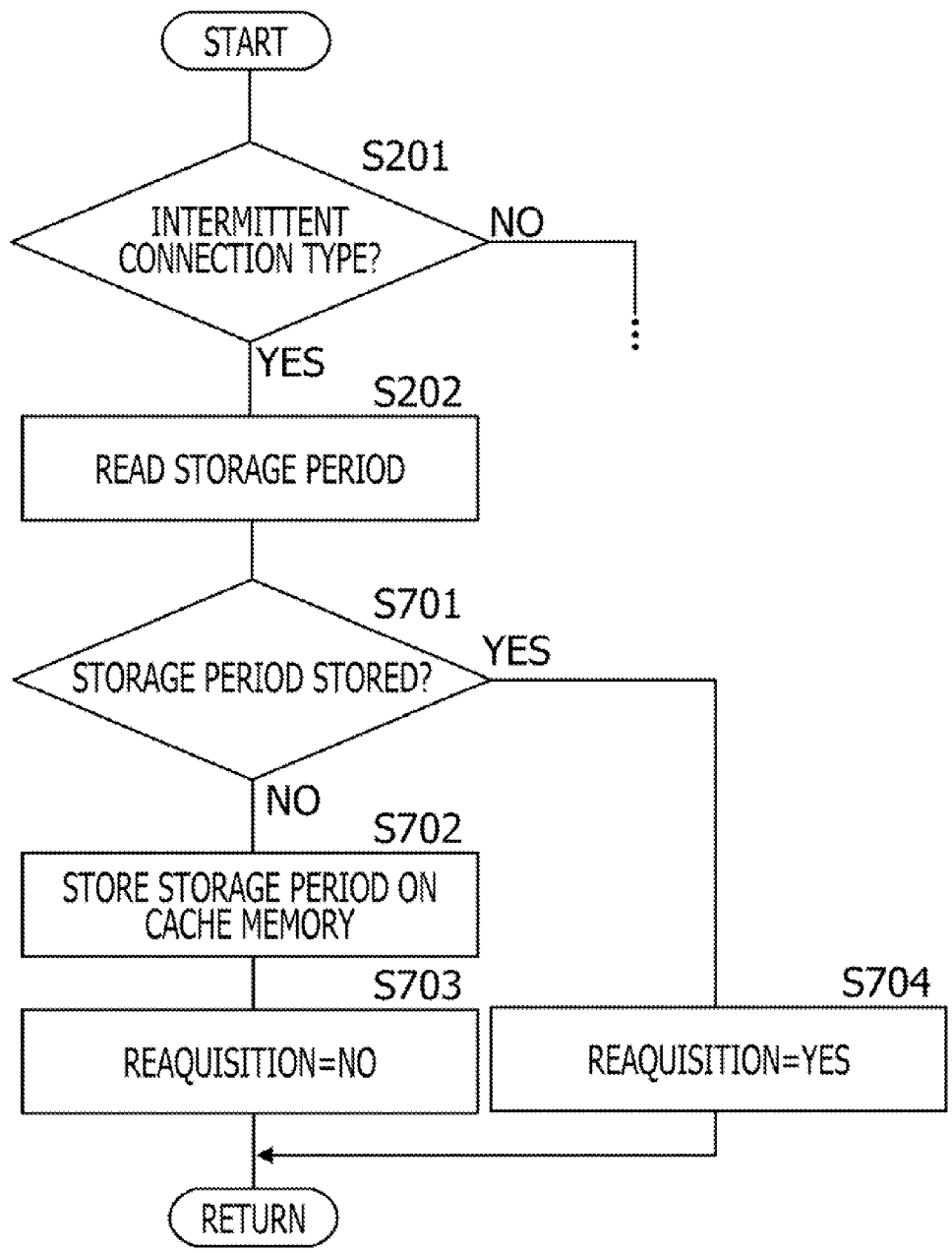
FIG. 17 is a flowchart illustrating a cache memory control process of the cache memory controlling apparatus of the fourth embodiment.

FIG. 17 is a flowchart of a cache memory control process of the cache memory controlling apparatus 1 of the fourth embodiment. The cache memory controlling apparatus 1 under the control of the controller 10 executing the cache control program PRG performs a process described below.

The cache memory controlling apparatus 1 under the control of the controller 10 executing the cache control program PRG performs operation S201 in the cache memory control process of the first embodiment. If it is determined that the sensor 2 is of the intermittent connection type, operation S202 is to be executed.

The cache memory control unit 104 in the controller 10 judges whether the storage period read in operation S202 is set (stored) on the cache memory 110 (operation S701).

If it is determined in operation S701 that the storage period is not set (no branch from operation S701), the cache memory control unit 104 in the controller 10 stores the storage period read in operation S202 on the cache memory 110 (operation S702). Operation S702 is substantially identical to operation S203 in the cache memory control process of the first embodiment.

The controller 10 has stored the storage period. The cache memory control unit 104 in the controller 10 then sets "NO" for the reacquisition flag of the cache memory 110 to indicate that the attribute information has not been reacquired (operation S703). The controller 10 thus ends the process.

If it is determined in operation S701 that the storage period is set (yes branch from operation S701), the cache memory control unit 104 in the controller 10 then sets "YES" for the reacquisition flag of the cache memory 110 to indicate that the attribute information has been reacquired (operation S704). The controller 10 thus ends the process. The cache memory control process of the fourth embodiment is thus performed.

Figure 18:
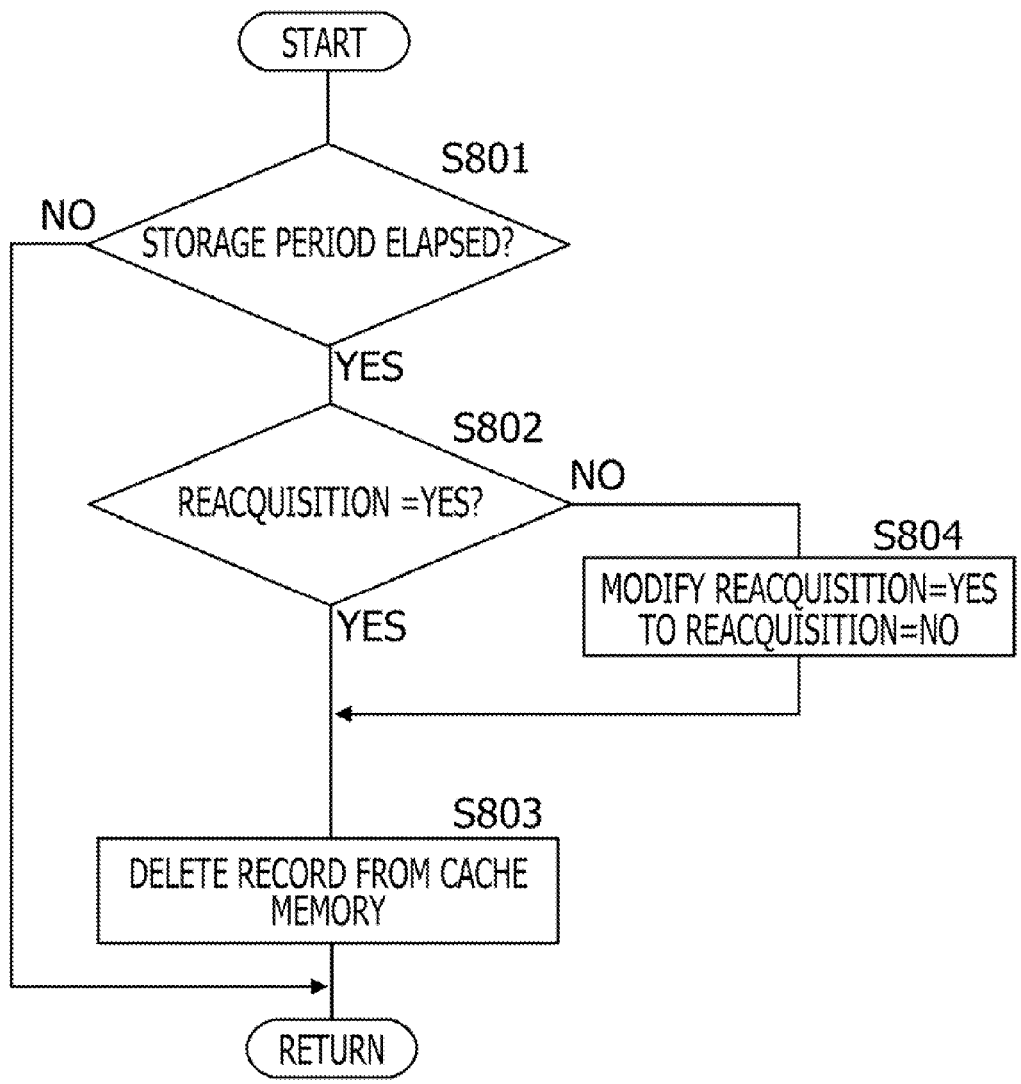
FIG. 18 is a flowchart illustrating a cache memory deletion process of the cache memory controlling apparatus of the fourth embodiment.

FIG. 18 is a flowchart illustrating a cache memory deletion process of the cache memory controlling apparatus 1 of the fourth embodiment. The cache memory controlling apparatus 1 of the fourth embodiment under the control of the controller 10 executing the cache control program PRG performs a process described below.

The cache memory control unit 104 in the controller 10 references the cache memory 110 to judge whether the storage period of the record has elapsed (operation S801). Operation S801 is substantially identical to operation S301 in the cache memory deletion process.

If it is determined in operation S801 that the storage period has elapsed (yes branch from operation S801), the controller 10 judges whether the reacquisition flag is "YES" or "NO" on the cache memory 110 (operation S802).

If it is determined in operation S802 that the reacquisition flag is "YES" (yes branch from operation S802), the controller 10 deletes the record from the cache memory 110 (operation S803). The process on the process target is thus complete.

If it is determined in operation S802 that the reacquisition flag is "NO" (no branch from operation S802), the controller 10 modifies the item of the intermittent connection corresponding to the sensor ID to "NO" (operation S804). Since the storage period has elapsed with no detection data acquired since the storage on the cache memory 110, the controller 10 judges that the sensor 2 is not of the intermittent connection type or that the connection enable period has elapsed. Operation S804 is thus performed as a flag modification process. Processing proceeds to operation S803 to delete the record and processing then ends.

If it is determined in operation S801 that the storage period has not elapsed (no branch from operation S801), the controller 10 ends the process on the process target without performing operation S802 and subsequent operations. The cache memory deletion process of the fourth embodiment is thus executed.

The second through fourth embodiments have been discussed as alternative embodiments to the first embodiment. The first through fourth embodiment may be appropriately combined.

As described with reference to the first embodiment of the present application, the cache memory control process may be performed using the subtraction timer. If the sensors as control targets increase in number, the demand for a timer resource increases, generally leading to a performance drop. The process of the second embodiment is applied to the number of sensors as the control process targets. The number of sensors as the control process targets is determined based on the remaining available memory capacity on the cache memory and the number of available subtraction timers. The number of subtraction timers in use is thus appropriately controlled.

In accordance with the first through fourth embodiments, temperature is a detection target. The present embodiments are not limited to temperature as a detection target. A variety of states including, e.g., an ambient condition, and a condition of the sensor may be a detection target. The detection targets include a variety measurement targets such as temperature, humidity, weight, a position of the sensor, the number of a person's steps, and sound recording and image capturing targets such as an image, video, and sound.

The embodiments discussed here are applicable to a distribution management system in which a cellular phone of a driver who transports products on a vehicle may be a sensor, and the position of the product is managed using a GPS function of the cellular phone. A product high in importance and urgency is set for continuous connection in order to manage successively the position of the product. A product low in importance and urgency is set for intermittent connection. In the operation of the system, the product low in importance and urgency may be monitored even with a slight delay as to whether the product is on a specific path.

A sensor operating from a rechargeable battery may be used. If the charging level of the battery is substantially equal to or above a specific value, the sensor is set for continuous connection because a real-time feature is important. If the charging level drops below the specific value, the sensor is set for intermittent connection such that sensing time period is prolonged.

The embodiments discussed in the present application may be applicable to data sent from a device other than a sensor.

The first through fourth embodiments have been discussed for exemplary purposes only, and hardware structures and software structures thereof are appropriately designed depending on the purpose and application of the controlling system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

The invention claimed is:

1. An apparatus for controlling a cache memory, the apparatus comprising:
   a memory including the cache memory configured to store attribute information mapped to a sensor ID; and
   a processor that executes a procedure in the memory, the procedure including
      a data receiving process to receive sensor information transmitted by a sensor, the sensor information including a sensor ID identifying the sensor and data detected by the sensor,
      a determining process to determine whether attribute information corresponding to the received sensor ID is stored in the cache memory,
      an attribute information acquiring process to acquire, when the attribute information corresponding to the received sensor ID is not stored in the cache memory, the attribute information corresponding to the received sensor ID from an attribute information memory, the attribute information memory storing the attribute information of the sensor mapped to the received sensor ID,
      a storing process to store the acquired attribute information corresponding to the received sensor ID in the cache memory for a limited storage period, the limited storage period being determined based on the frequency of receiving sensor information transmitted by the sensor.

2. The apparatus according to claim 1, wherein the sensor information further includes an indication whether the sensor transmits data mapped to the sensor ID intermittently.

3. The apparatus according to claim 2, wherein the procedure further includes,
   a judging process to perform a judging operation to judge whether the sensor transmits the data intermittently based on log data received from the sensor, and
   a sensor information rewriting process to rewrite the sensor information to the sensor information memory based on the judging operation.

4. The apparatus according to claim 3, wherein the judging process performs the judging operation at a specified time interval, and
   wherein the sensor information rewriting process rewrites the sensor information in response to the judging operation obtained at the specified time interval.

5. The apparatus according to claim 3, wherein the procedure further includes,
   a cache memory detector process to detect a storage status of the cache memory,
   wherein in response to the detected storage status, the judging process modifies a threshold value according to which the judging operation is performed to judge whether the sensor transmits the data intermittently.

6. The apparatus according to claim 3, wherein the judging process judges that the sensor corresponding to the attribute information does not transmit the data intermittently when the attribute information has not been acquired during the limited storage period after the attribute information was last stored on the cache memory.

7. The apparatus according to claim 2, wherein the procedure further includes,
   a judging process to perform a judging operation to judge whether the sensor transmits the data intermittently based on a comparison between a threshold value and a period that the sensor does not transmit data.

8. The apparatus according to claim 1, wherein the procedure further includes,
   an acquiring a representative value process to acquire a representative value of a group equal to or above a mean value corresponding to the sensor ID;
   a determining a log usage period process to determine a log usage period based on the representative value;
   an acquiring process to acquire an acquisition time and acquisition interval based on the determined log usage period; and
   a calculation process to calculate a mean value of acquisition intervals.

9. A method for controlling a cache memory executed by a computer, the method comprising:
   receiving sensor information transmitted by a sensor, the sensor information including a sensor ID identifying the sensor and data detected by the sensor;
   judging whether attribute information corresponding to the received sensor ID is stored in the cache memory;
   acquiring, when the attribute information corresponding to the received sensor ID is not stored in the cache memory, the attribute information corresponding to the received sensor ID from an attribute information memory, the attribute information memory storing the attribute information of the sensor mapped to the received sensor ID; and
   storing, for a limited storage period, the acquired attribute information corresponding to the received sensor ID, the limited storage period being determined based on the frequency of receiving sensor information transmitted by the sensor.

10. The method according to claim 9, further comprising:
   judging whether the sensor transmits data intermittently based on a comparison between a threshold value and a period that the sensor does not transmit data.

11. The method according to claim 9, further comprising:
   acquiring a representative value of a group equal to or above a mean value corresponding to the sensor ID;
   determining a log usage period based on the representative value;
   acquiring an acquisition time and acquisition interval based on the determined log usage period; and
   calculating a mean value of acquisition intervals.

12. A non-transitory computer readable medium storing a program, the program causing a computer to execute a method, the method comprising:
   receiving sensor information transmitted by a sensor, the sensor information including a sensor ID identifying the sensor and data detected by the sensor;
   judging whether attribute information corresponding to the received sensor ID is stored in a cache memory;
   acquiring, when the attribute information corresponding to the received sensor ID is not stored in the cache memory, the attribute information corresponding to the received sensor ID from an attribute information memory, the attribute information memory storing the attribute information of the sensor mapped to the received sensor ID; and
   storing, for a limited storage period, the acquired attribute information corresponding to the received sensor ID, the limited storage period being determined based on the frequency of receiving sensor information transmitted by the sensor.

13. The non-transitory computer readable medium storing a program according to claim 12, the method further comprising:
   judging whether the sensor transmits data intermittently based on a comparison between a threshold value and a period that the sensor does not transmit data.

14. The non-transitory computer readable medium storing a program according to claim 12, the method further comprising:
   acquiring a representative value of a group equal to or above a mean value corresponding to the sensor ID;
   determining a log usage period based on the representative value;
   acquiring an acquisition time and acquisition interval based on the determined log usage period; and
   calculating a mean value of acquisition intervals.

* * * * *